United States Patent
Hastings, Sr.

(10) Patent No.: US 7,081,812 B2
(45) Date of Patent: Jul. 25, 2006

(54) AUDIBLE WARNING SYSTEM FOR VEHICLES OUTFITTED WITH EXTENSIBLE STRUCTURES

(75) Inventor: Charles M. Hastings, Sr., 320 Summit Dr., Redwood City, CA (US) 94062

(73) Assignee: Charles M. Hastings, Sr., Redwood City, CA (US)

(*) Notice: Subject to any disclaimer, the term of this patent is extended or adjusted under 35 U.S.C. 154(b) by 25 days.

(21) Appl. No.: 10/669,487

(22) Filed: Sep. 23, 2003

(65) Prior Publication Data

US 2004/0066284 A1 Apr. 8, 2004

Related U.S. Application Data

(60) Provisional application No. 60/413,065, filed on Sep. 24, 2002.

(51) Int. Cl.
*B60Q 1/00* (2006.01)

(52) U.S. Cl. .................. 340/456; 340/425.5; 180/271

(58) Field of Classification Search ................ 340/456, 340/425.5, 435, 426.15, 438, 463, 686.1, 340/457; 180/271, 274; 116/28 R, 30
See application file for complete search history.

(56) References Cited

U.S. PATENT DOCUMENTS

| | | | |
|---|---|---|---|
| 3,833,898 A | 9/1974 | Wilkinson | 340/267 |
| 3,882,957 A | 5/1975 | Fritz | 180/104 |
| 4,064,997 A | 12/1977 | Holland et al. | 212/39 |
| 4,243,127 A | 1/1981 | Lee et al. | 192/4 |
| 4,649,375 A | 3/1987 | Duppong et al. | 340/660 |
| 4,727,447 A | 2/1988 | Rome | 361/1 |
| 4,849,735 A | 7/1989 | Kirtley et al. | 340/539 |
| 4,942,937 A * | 7/1990 | Amberger et al. | 180/271 |
| 4,979,588 A | 12/1990 | Pike et al. | 182/18 |
| 4,983,949 A * | 1/1991 | Wicker | 340/433 |
| 5,355,117 A * | 10/1994 | Jefferson | 340/425.5 |
| 5,371,581 A | 12/1994 | Wangler et al. | 428/304.4 |
| 5,602,526 A * | 2/1997 | Read | 340/457 |
| 5,685,255 A | 11/1997 | Arzu | 116/30 |
| 5,781,120 A * | 7/1998 | Kucik | 340/425.5 |
| 5,850,891 A | 12/1998 | Olms et al. | 182/127 |
| 5,980,070 A | 11/1999 | Hulse et al. | 362/385 |
| 6,046,706 A | 4/2000 | Vargas | 343/883 |
| 6,069,558 A | 5/2000 | Kershaw | 340/435 |
| 6,133,841 A | 10/2000 | Beckmann | 340/685 |
| 6,137,419 A * | 10/2000 | Lennox et al. | 340/687 |
| 6,170,607 B1 | 1/2001 | Freeman et al. | 182/18 |
| 6,252,513 B1 | 6/2001 | Beckmann | 340/685 |
| 6,374,766 B1 * | 4/2002 | Clark | 116/28 R |
| 6,396,395 B1 * | 5/2002 | Zielinski et al. | 340/425.5 |
| 6,595,330 B1 | 7/2003 | Henrickson et al. | 187/277 |
| 2003/0201876 A1 * | 10/2003 | Stegman et al. | 340/433 |

* cited by examiner

*Primary Examiner*—Phung T. Nguyen
(74) *Attorney, Agent, or Firm*—Buchanan Ingersoll PC

(57) ABSTRACT

A simple and easily-installed system for vehicles equipped with an extensible pole, mast, boom, or other structure, providing an audible alarm when the operator attempts to drive away without first completely retracting the pole, mast, boom, or other extensible structure. The system includes a sensor for sensing a first position and a second position of a vehicle's gearshift lever, and a control module. The control module receives an electrical signal from an extensible structure when the extensible structure is fully or partially deployed and communicates the electrical signal to an audible alarm if the sensor senses that the vehicle's gearshift lever has been moved from the first position to the second position.

23 Claims, 6 Drawing Sheets

AUDIBLE WARNING SYSTEM FOR VEHICLES OUTFITTED WITH EXTENSIBLE STRUCTURES

CROSS-REFERENCE TO RELATED APPLICATIONS

This application claims priority to U.S. Provisional Patent Application Ser. No. 60/413,065, filed on Sep. 24, 2002, which is incorporated herein by reference in its entirety.

FIELD OF THE INVENTION

This invention relates to a dangerous condition, which exists whenever the operator of a vehicle equipped with an extensible structure such as a mast, pole, or boom fails to retract the extensible structure before driving the vehicle, and more particularly to an audible alarm for vehicles having an extensible structure.

BACKGROUND

Although the remarks in this Application, apply to television microwave trucks (hereinafter called "ENG vans"), the final use and application of this patent is not to be restricted only to ENG vans, but rather is to be applied to any vehicle equipped with an extensible mast, pole or other structure.

Often, when an operator makes such an error, the extensible structure collides with an overhead obstruction such as an overhead streetlight, a tree branch, the overhanging lip of a building, etc. At the very least, there is usually significant damage to whatever equipment has been attached to the upper end of the extensible structure, and also to the extensible structure itself.

In the case of an ENG van, for example, a pneumatic mast damaged in this way can cost several tens of thousands of dollars to remove and replace. If the electronic equipment at the top of the mast (usually, in a television application, a microwave transmitter) is damaged or destroyed too, repair or replacement can cost several tens of thousands of dollars more.

Even worse is collision with an overhead obstruction such as a charged electrical power line. Most extensible structures are of metal construction, and so power from the overhead power line will travel down the structure and charge the metal body of the ENG van with a potentially lethal level of electricity. The result can be death or serious injury by electrocution of all those associated with the ENG van including the operator, any passenger in the ENG van, and any rescue worker or bystander who tries to help.

Typically, companies which outfit ENG vans, or manufacture extensible pneumatic masts, or manufacture or sell accessories for ENG vans or pneumatic masts provide the following systems:
  (a) A visual warning system that senses when the ENG van's mast is extended and flashes warning lights mounted within the ENG van's cab. (It is the inventor's experience that the majority of ENG vans produced before 2001 are equipped with this system.)
  (b) An electronic device that senses overhead power lines or obstructions within a user-defined radius of the extensible mast and inhibits further extension of the mast if either overhead power lines or obstructions exist. Further, if the mast has been safely extended to partial or full height, these systems can prevent if desired the ENG van operator from shifting out of "park" and driving away until the mast is fully retracted. These systems require extensive installation procedures.
  (c) An alarm that requires removal of the ENG van's dashboard in order to install a sensor, which determines if the ENG van is in "park" when the operator attempts to drive away with the mast extended. If this should be the case, the system sounds an audible alarm.
  (d) A sensor on the ENG van's parking brake and, if the brake is set and the mast is extended, causes the ENG van's horn to sound if the parking brake is released. Installation requires removal of the ENG van's dashboard.

Accordingly, what is needed is a low-cost, easily installed system which sounds an audible alarm when the ENG van operator attempts to drive away with the ENG van's mast fully or partially extended; and does not inhibit the ability of the operator to drive the vehicle with the mast extended.

In consideration of procedures necessary to produce an audible alarm when the operator tries to drive an ENG van away with its mast extended, it is obvious there are three key conditions, which must be sensed and acted upon simultaneously:

Condition 1: The system must sense, and produce an electrical signal, whenever the ENG van's mast is extended;

Condition 2: The system must sense, and produce an electrical signal, whenever the ENG Van's gearshift is moved from "park" position to any other drive position; and Condition 3: The system must sense when Conditions 1 and 2 are met and, when the vehicle's ignition switch is turned "on" sound and lock on an audible alarm, which cannot be muted until the system is reset to "safe" mode.

It is only when Conditions 1 and 2 are met that it is appropriate to produce an audible warning signal because a potentially hazardous condition exists.

With Respect to Condition 1:

Most of the pneumatic extensible masts used in ENG vans in the United States include a proprietary sensing system which causes a warning light or lights to flash (or, alternatively, a circuit which produces an electrical signal whenever the extensible mast is extended) in the cab of an ENG van when the mast is extended and the ignition switch is turned on. This system, however, does not produce an audible alarm unless the customer orders a more complex device which not only senses mast-up but also the presence of overhead power lines, nearby obstructions, etc. This system is expensive and requires skilled and authorized installation.

With Respect to Condition 2:

Typically, the systems, which are applied to motor vehicles, are either:
  (e) gear shift assemblies which accomplished shifting the vehicle's gear ratios from one ratio to another, with gear position indication an integral part of the shifter; or
  (f) a visual means to indicate on the dashboard into which gear the vehicle had been shifted.

All of (e) above went far beyond the scope of merely indicating if the gearshift lever was or was not in "park" and required extensive installation and integration into the operating system of the vehicle.

All of (f) above required extensive installation, either by removal of the vehicle's dashboard, or by device attachment directly to the vehicle's transmission by means of brackets, cables, etc.

This invention fills the void between systems, which provide only visual warnings, and expensive systems requiring extensive installations.

SUMMARY OF THE INVENTION

This invention provides a simple, easily installed means of warning the operator of an ENG van that he may be about to drive off with the mast extended.

If a drive-off is attempted with the mast extended, an audible alarm sounds which will not quiet until the operator returns the gearshift to "park" position and turns the ignition off. If a drive-off is attempted before the mast has been completely retracted, the alarm will continue to sound. Only when the mast is completely nested may the van be driven away without the alarm sounding.

It should be noted that this invention does not in any way inhibit the ability of the operator to drive away with the extensible structure deployed. This is an important positive safety consideration. If the ability to drive with the mast extended is taken away from the operator by any system such as one of those described in (b) above, the operator may be in a more hazardous situation than he would otherwise find himself. In a situation involving civil disturbance, flood, forest fire, etc., conditions can change very quickly and require instant departure to preserve personal or equipment safety. The ability to drive out of harm's way should not be taken away from the operator by a device, which cannot be bypassed or over-ridden.

In accordance with one aspect of the present invention, an audible alarm system for vehicles having an extensible structure, the system including a sensor for sensing a first position and a second position of a vehicle's gearshift lever, wherein the sensor is affixed to an exterior of the vehicle's dashboard; and a control module, the control module receiving an electrical signal from an extensible structure when the extensible structure is fully or partially deployed and, wherein the control module communicates the electrical signal to an audible alarm if the sensor senses that the vehicle's gearshift lever has been moved from the first position to the second position.

In accordance with another aspect of the present invention, an audible alarm system for vehicles having an extensible structure, the system including a sensor for sensing a first position and a second position of a vehicle's gearshift lever, wherein the sensor comprises a magnetic sensing switch affixed to a vehicle's dashboard and a magnet affixed to the vehicle's gearshift lever; and a control module, the control module receiving an electrical signal from an extensible structure when the extensible structure is fully or partially deployed and, wherein the control module communicates the electrical signal to an audible alarm if the sensor senses that the vehicle's gearshift lever has been moved from the first position to the second position.

In accordance with a further aspect of the present invention, a method of warning an operator of a vehicle having an extensible structure when the vehicle is about to be driven with the extensible structure deployed, the method including the step of sensing a first position and a second position of a vehicle's gearshift lever; and receiving an electrical signal from an extensible structure when the structure is fully or partially deployed; and communicating the electrical signal to an audible alarm if the sensor senses that the vehicle's gearshift lever has been moved from the first position to the second position.

BRIEF DESCRIPTION OF DRAWINGS

The invention will now be described in greater detail with reference to the preferred embodiments illustrated in the accompanying drawings, in which like elements bear like reference numerals, and wherein.

DETAILED DESCRIPTION OF THE INVENTION

Figure 1:
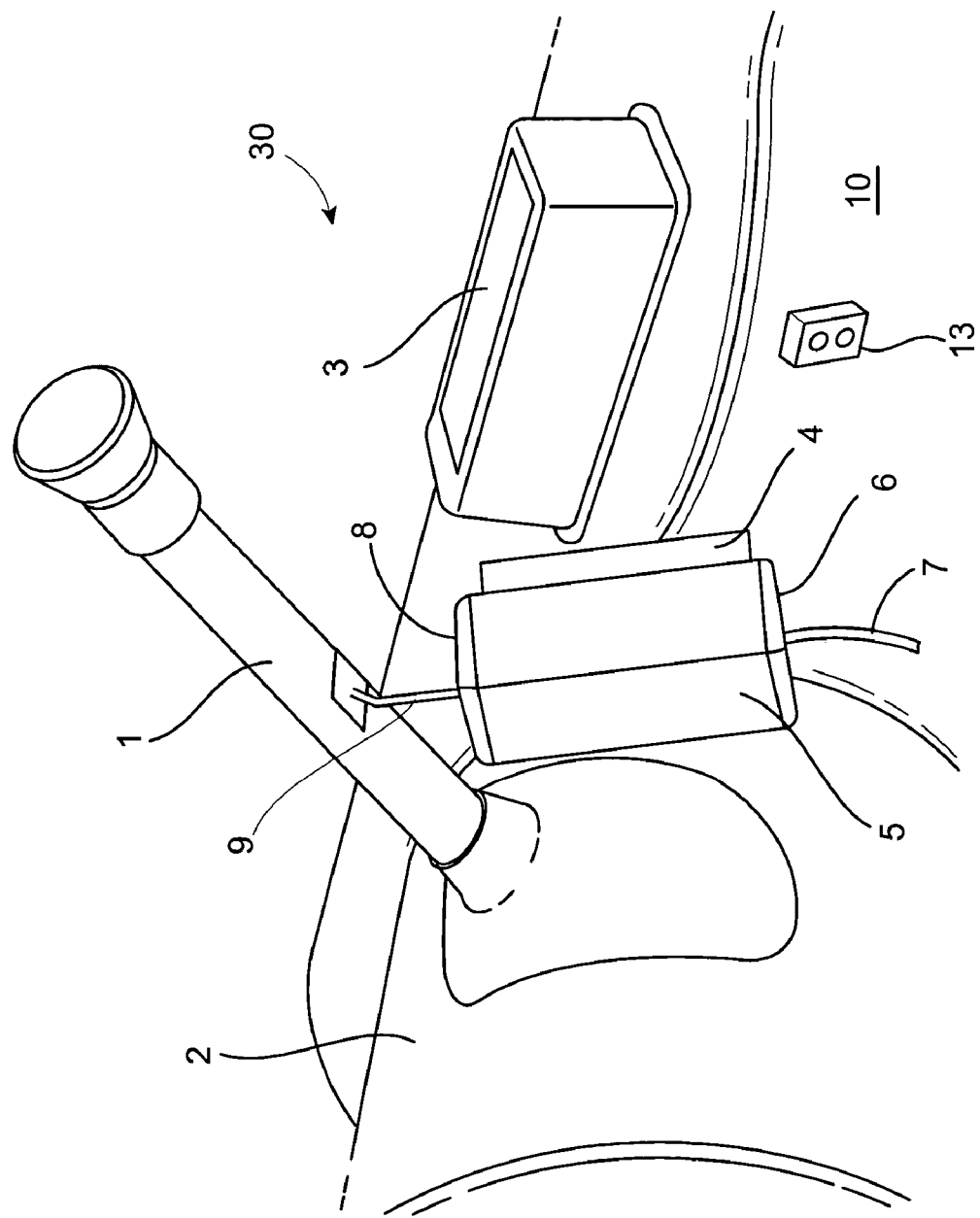
FIG. 1 is a perspective view of a portion of a vehicle's dashboard showing the vehicle's gearshift lever in a "park" position and a sensor according to the present invention.

The present invention relates to an audible alarm system 30 for vehicles having an extensible structure. The system 30 includes a sensor 5 for sensing a first position and a second position of a vehicle's gearshift lever 1, and a control module 16. The control module 16 receives an electrical signal from an extensible structure and communicates the electrical signal to an audible alarm 13 if the sensor 5 senses that the vehicle's gearshift lever 1 has been moved from the first position ("park position") to the second position ("neutral or drive").

FIG. 1 is a perspective view of a sensor 5 with a shim 4 to adjust the distance between the sensor 5 and the vehicle's gearshift lever 1. As shown the gearshift lever 1 is in a first position or "park" position. The actuating arm 9 of a single pole single throw (SPST) normally open microswitch (not shown) mounted within the sensor 5 makes physical contact with the bottom of the gearshift lever 1, depressing the actuating arm 9. The actuating arm 9 passes through a hole (not shown in this perspective) in an end cap 8 that protects the microswitch inside the sensor 5. When the actuating arm 9 is depressed the contact set of the microswitch is activated and no current passes through the microswitch. The sensor 5 is fitted with an end cap 6 through which a hole is drilled, equipped with a grommet, through which wires 7 pass. One of the wires 7 is connected to a control module 16 (shown in FIG. 5) to one of the terminals of an incandescent bulb in a flashing red light 3 mounted on the vehicle's dashboard 10, or to an alternate signal source activated whenever the vehicle's mast or other extensible structure is raised. The other wire is connected to a point on the control module's circuit board.

Figure 2:
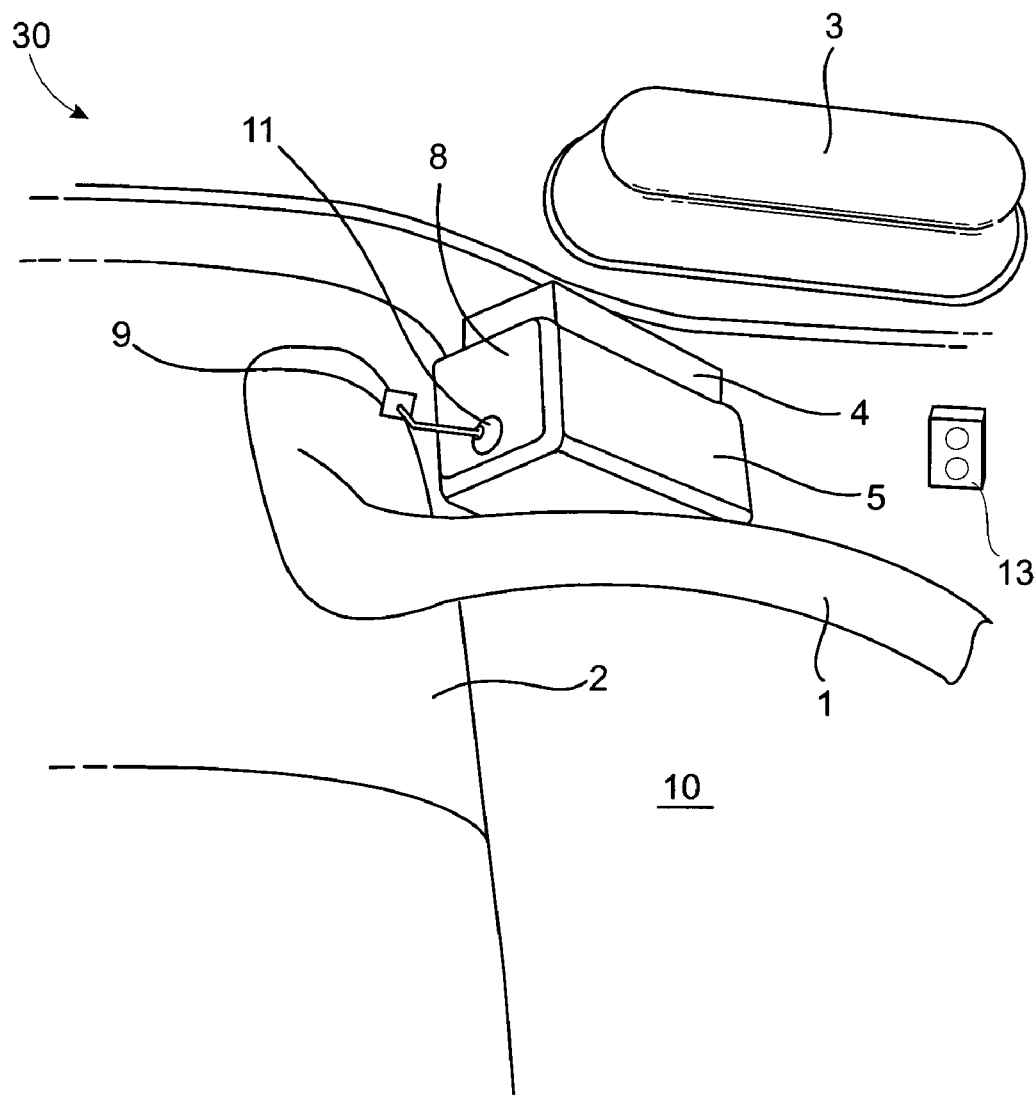
FIG. 2 is a perspective view of the steering column of a vehicle, showing the vehicle's gearshift lever out of "park" position, and the sensor according to the present invention.

FIG. 2 is a perspective view of the sensor 5 and gearshift as shown in FIG. 1 except from another perspective. In FIG. 2, the gearshift lever 1 is not in the "park" position, such that the actuating arm 9 of the microswitch, passing through the hole 11 in the end cap 8 of the sensor 5, is no longer depressed and thus is in normally closed position and passing voltage from the flashing red light 3, or from the alternate signal source, into the control module 16.

Figure 3:
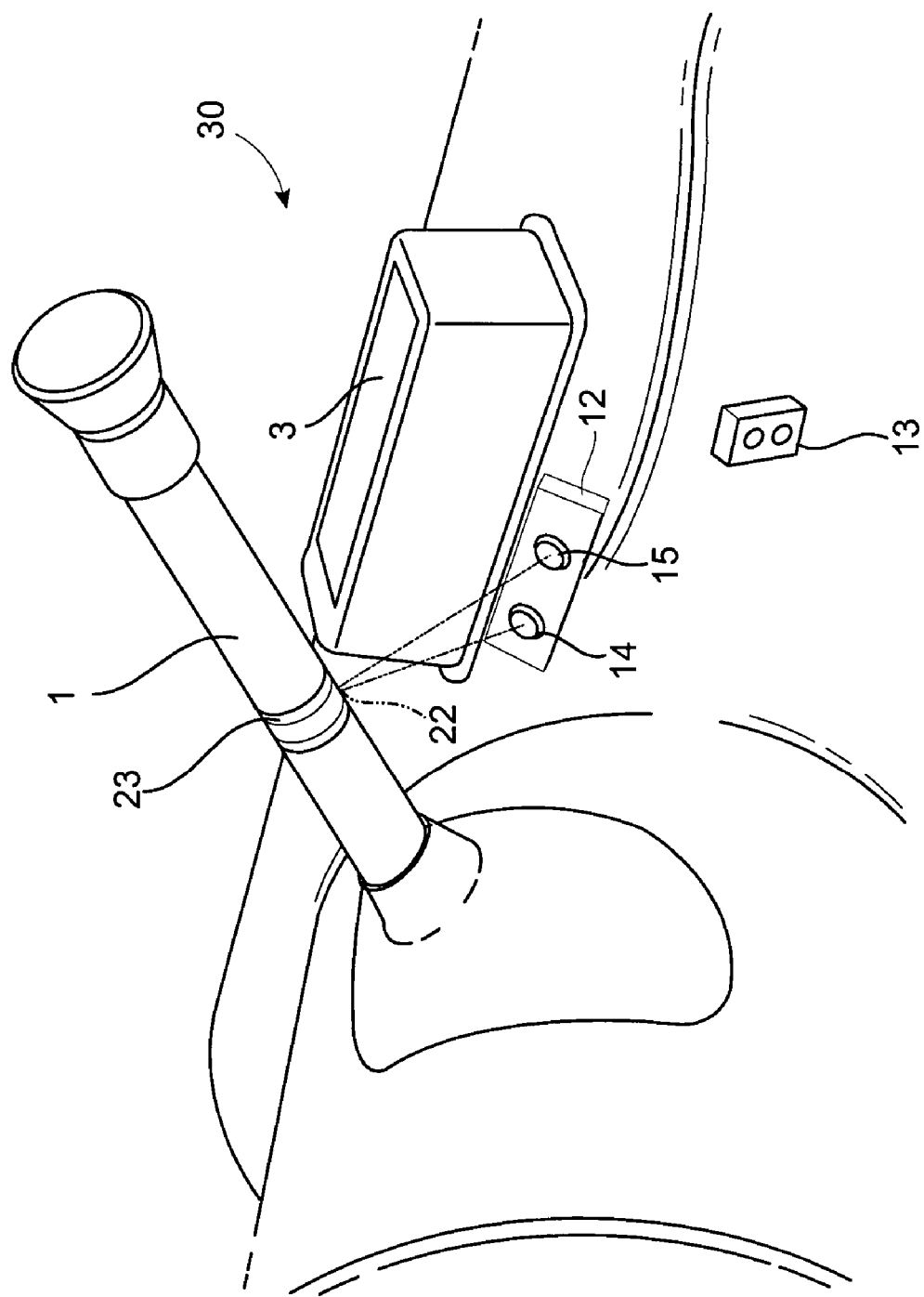
FIG. 3 is a perspective view of a vehicle's steering column and gearshift lever, and a sensor according to alternative embodiment of the present invention.

In an alternative embodiment as shown in FIG. 3, the sensor 12 includes an infrared LED emitter 14 and infrared detector 15. In this embodiment, the sensor 12 is positioned beneath the gearshift lever 1, so that it is positioned directly above an infrared LED emitter 14 and an infrared detector 15. The components are arranged so that a beam 22 from the emitter 14 strikes the reflective material 23 on the gearshift lever 1 and is reflected back into the detector 15. Circuitry is arranged so that when an infrared beam 22 is detected no current passes through the device; and when an infrared beam 22 is not detected then current passes through the sensor device 12. This current is fed back into the control module.

Figure 4:
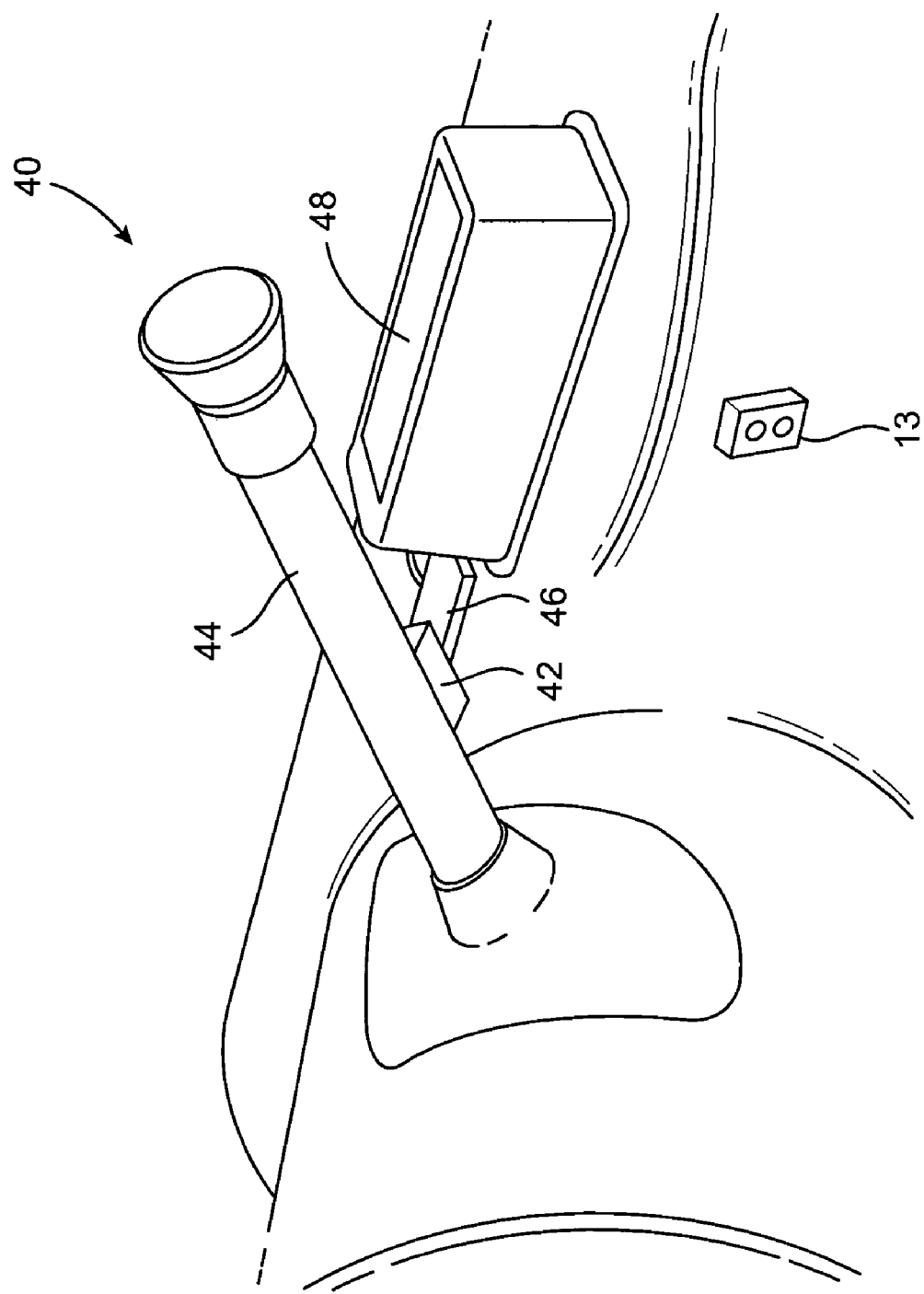
FIG. 4 is a perspective view of a magnetic sensing device according to another embodiment of the present invention.

FIG. 4 shows another embodiment of the system 40 including a magnetic sensing system. The magnetic sensing system includes a magnetic sending element 42 mounted or affixed on the vehicle's gearshift lever 44, and a sensing device 46 mounted or affixed on the dashboard 48. The magnetic sending element 42 is preferably a magnet or a magnetic device known to those skilled in the art. The magnetic sending element 42 creates a powerful magnetic signal that is received by the sensing device 46. The magnetic sensing element is preferably about ¼ to about 2 inches, more preferably about ½ to about 1 inch and most preferably about ¾ inch from the sensing device 46.

When the vehicle's gearshift lever 48 is in a first position (i.e. PARK), the sensing device 46 receives a magnetic signal from the magnetic sending element 42 and locks an alarm function of the control module 16 in an off position. When the gearshift lever 44 is moved from the first position, the lock-off is released and the system 40 is alarmed and ready to sound off. When the gearshift lever 44 is moved from the first position to a second position, the final required component is present and an electrical signal is sent to the control module 16, which causes the switching device with the control module to sound the alarm siren 13 and lock itself into an ON mode. In addition, the system 40 can includes at least one flashing light 48 to alert the operator of the vehicle that the mast or extensible structure is either partially or fully deployed.

In operation, an electrical signal from the base of the mast passes to and through the sensing device 46 into the control module 16. The control module 16 causes the switching device to sound the alarm siren 13 and to lock itself into an ON mode. The switching device will remain ON, with the alarm sounding, until the ignition is turned off and power is taken away from the system.

Figure 5:
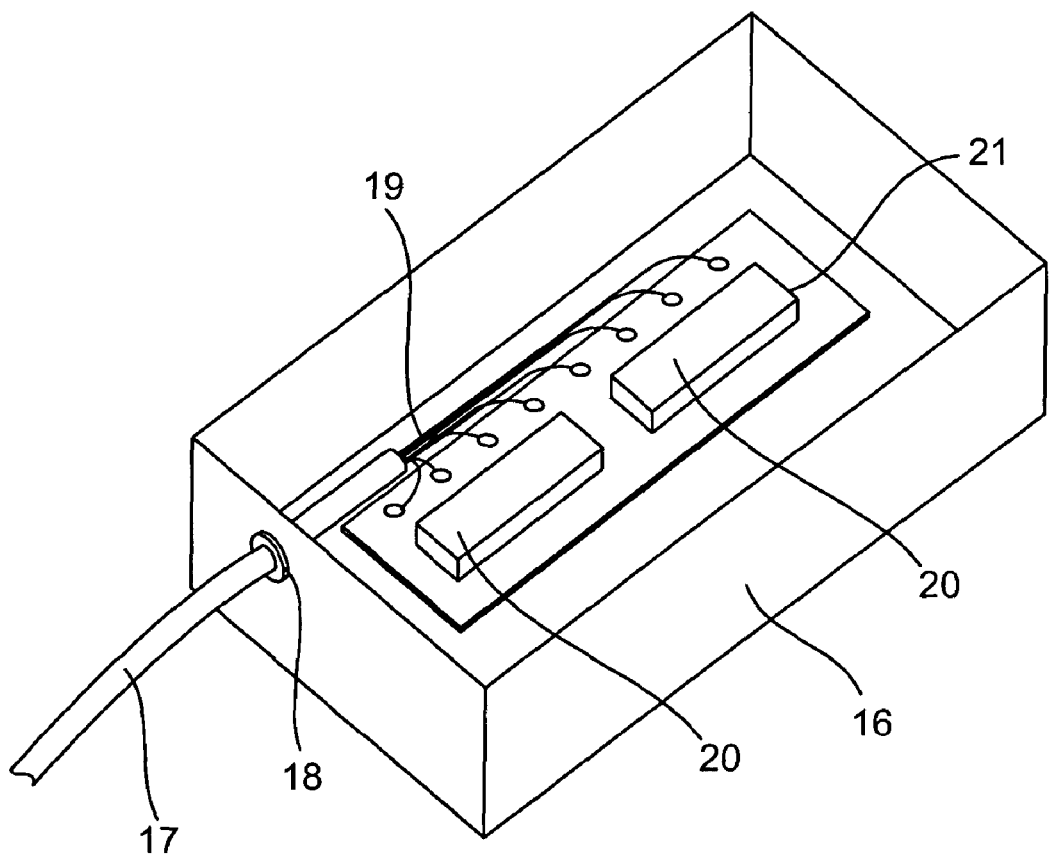
FIG. 5 is a perspective view of a control module showing the enclosure, the interconnecting cable, the circuit board, and components mounted on the circuit board.

FIG. 5 is a perspective view of the control module 16. A cable 17, passing through a grommet hole 18, connects the control module 16 to the components of the system installed within the vehicle, and to power source points within the vehicle. Within the control module 16, a wire breakout 19 allows connection of the cable 17 wires to points on the circuit board 21. These points are connected to various components 20 mounted on the circuit board 21.

The control module 16 contains a circuit board 21 and components, which control the functions of the alarm system. The control module 16 can be equipped with a pigtail cable and a mini DB-9 male connector to mate with a connector on a harness. Typically, an incoming signal from the vans flashing mast light circuit triggers a switching device, which arms the alarm siren 13 and prepares the system to sound off. If the van or vehicle's ignition is ON and the mast is partially or fully deployed, shifting out of PARK triggers the alarm. The alarm 13 will not mute until the operator shifts back into PARK and turns the ignition OFF. In one embodiment, the control module 16 does not contain a fuse. However, the system can included a 2-amp fuse for the entire system is on a fuse block tap component, which plugs into the vehicles electrical system and can be found at the end of a harness wire. Inside the control module 16, a seal covers the circuitry and components to prevent tapering. The control module 16 can be mounted or affixed to the dashboard of the vehicle using Velcro, epoxy or any other means known to those skilled in the art.

Figure 6:
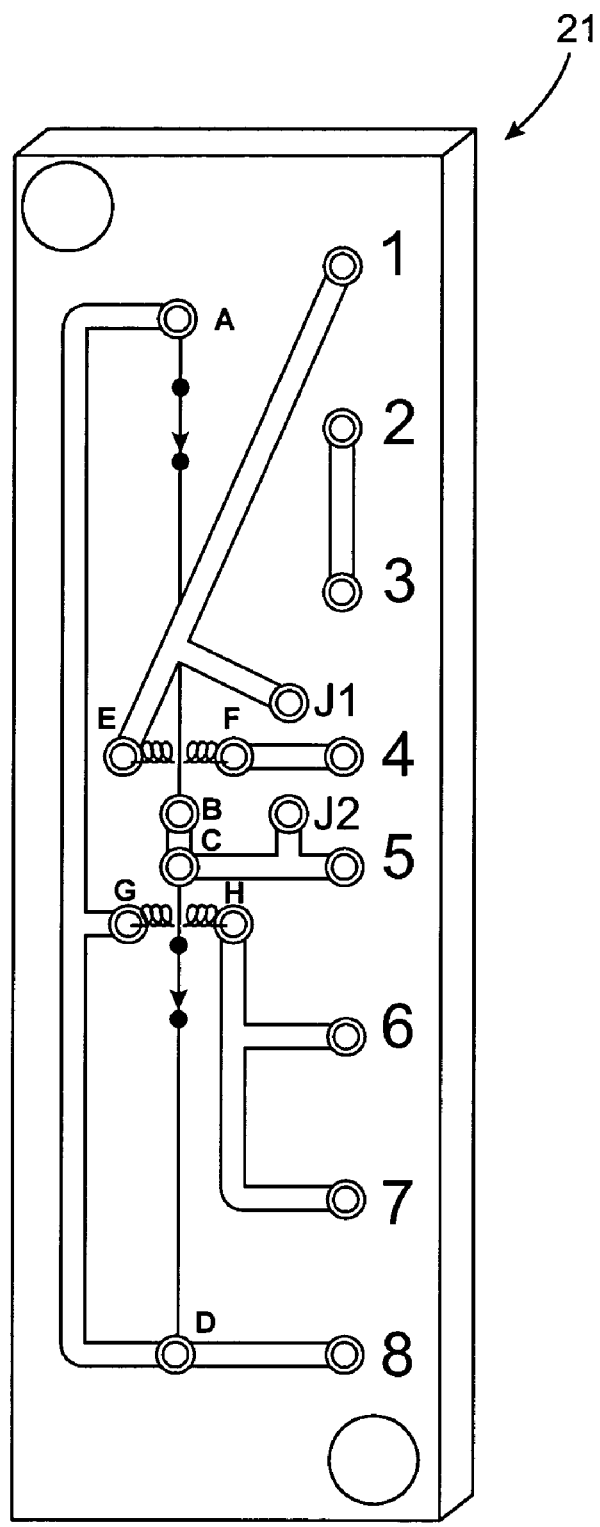
FIG. 6 is a perspective view of the circuit board of the control module of FIG. 5.

FIG. 6 is a schematic drawing of the circuit board 21. The circuit board 21 includes a plurality of terminal connections for connecting the components of the system installed within the vehicle, and to power source points that are part of the vehicle. For example, in one embodiment, the circuit board 21 includes 8 terminals wherein, Terminals 1 and 2 are connected to the input from factory installed flashing red lights, Terminals 3 and 4 are connected to the shift position sensor wherein terminals 3 and 4 do not receive an electrical charge when not energized by a gearshift magnet, Terminals 5–8 are connected to +12 VDC input, −12 VDC input, −12 VDC output to siren, and +12 VDC output to siren, respectively. Alternatively, the circuit board 21 can use a switched ground signal from the mast instead of the flashing lights. In this embodiment, Terminals J1–-J2 are enable jumpers to J1 & J2, Terminal 1 is unused, Term 2 is connected to the incoming switched ground (−12 VDC) signal, Terminals 3 and 4 are connected to the shift position sensor wherein terminals 3 and 4 do not receive an electrical charge when not energized by a gearshift magnet, Terminals 5–8 are connected to +12 VDC input, −12 VDC input, −12 VDC output to siren, and +12 VDC output to siren, respectively. Components AB and CD are relay contacts N/C 3 watts and EF and GH are relay coil 1050 ohms at 12 Volts. It can be appreciated that the use of the terminals as illustrated and described herein are only examples and it should be understood that the circuit board can be designed in other manner know to one skilled in the art.

The alarm siren 13 as shown in FIGS. 1–4 is preferably a small unit, which is attached to the underside of the vehicle's dashboard 10 with Velcro for ease of installation. Other means of attaching the alarm siren 13 can be performed without departing from the present invention. The alarm siren 13 can provide an about 80 to 110 dB warbling siren sound, and more preferably an about 100 to about 105 dB warbling siren sound, and most preferably about 102 dB warbling siren sound, whenever the system is activated.

OPERATION

The control module 16 is preferably installed in the ENG van at some convenient place, usually underneath the vehicle's dashboard 10. Connections are made to the module 16 between positive 12 volts DC (the vehicle's electrical system) and negative 12 volts DC (usually, the vehicle's chassis). Connections between the control module 16 and the vehicle systems can include one of many options. For example:

CONNECTION OPTION #1: using both terminals of one of the flashing red lights (discussed in BACKGROUND (a) above) which produces a 12 volt signal measured across both terminals of one of the indicator lights.

CONNECTION OPTION #2: using any point in the ENG van's systems which produces a 12-volt signal, measured across vehicle ground, whenever the extensible structure is deployed.

In addition, the system can use a gearshift position sensor consisting of one of many gearshift sensor options including but not limited to the following:

GEARSHIFT POSITION/SENSOR OPTION #1 (as shown in FIGS. 1 and 2): a snap-action normally closed microswitch mounted within a protective housing is mounted on the dashboard of the vehicle, in such a way that when the vehicle's gearshift is in "park" position the actuating arm of the microswitch is depressed and the switch is open, but when the gearshift is moved out of "park," then the actuating arm of the microswitch is released and the switch is closed, or GEARSHIFT POSITION SENSOR/OPTION #2 (as shown in FIG. 3): a semiconductor device, mounted within a protective housing on the dashboard of the vehicle so that an infrared light signal generated by a LED in the device is bounced from a reflective material affixed to the gearshift lever back into a receptor on the device, so that when the infrared signal is reflected and received, the shift lever is in "park" position, and when the infrared signal is not reflected and received, the shift lever is not in "park" position.

GEARSHIFT POSITION SENSOR/OPTION #3 (as shown in FIG. 4): a magnetic gearshift sensor and magnet or gearshift sender. The sensor includes a shim and a sensor unit that is affixed to the shim with a pair of 4–40 cap screws. After positioning the sensor and the sender correctly, the shim is epoxied onto the vehicles dashboard. If it is necessary to replace the sensor unit, the cap screws can be removed and a replacement sensor installed with little difficulty. The gearshift sender is epoxied to the underside of the gearshift lever in a position that guarantees it proper interaction with the sensor unit. The gearshift sender can be designed to accommodate gearshift levers of any size and shape, but is preferably designed for gearshift levers having a diameter of about ¼ inch to about 1 inch and more preferably about ½ inch.

It can be appreciated that the Gearshift position sensor/options are only examples of position sensors that can be used with the present invention and that any type of sensing device that can sense the position of the gearshift lever of a vehicle can be used with the present invention.

Finally, a pair of conductors feeds a positive and negative voltage from the module to actuate a piezo alarm siren. Electrical operation is as follows:

A circuit board 21 within the control module 16 has installed upon it a pair of remotely controlled switching devices. These may be either common electromechanical reed relays, of contact form single pole single throw/normally closed, or may be any other remotely controlled device which, when an electrical current is applied, causes the device to pass from an input terminal to an output terminal. For the purposes of this description of operation the remotely controlled switching devices will be called a first relay and a second relay; but this nomenclature is not to limit the remotely controlled switching devices to electromechanical relays only.

The positive voltage generated by the vehicle's electrical system coming into the control module is connected directly to the common terminal of both the first relay and the second relay.

Also, negative 12 volts is connected directly to one of the coil terminals of the second relay, and to the negative lead to the piezo alarm. Using Connection Option #1, one coil terminal of the first relay is connected directly to one terminal of one of the flashing red lights on the dashboard. And, a connection from the other flashing red light terminal passes through the gearshift position sensor and thence to the other coil terminal of the first relay. Using Connection Option #2, a signal is taken from the signal source providing a +12 volt signal whenever the extensible structure is deployed and connected to one of the two coil terminals of the first relay. And, a connection from vehicle ground passes through the gearshift position sensor and thence to the other coil terminal of the first relay. In order for the coil of the first relay to activate, two things must happen:

(1) The mast must be extended and the red light(s) flashing, or the alternate signal source providing a +12 volt signal; and (2) the gearshift must be moved out of "park" which causes the gearshift position sensor to pass voltage from the other terminal of the flashing red light, or vehicle ground, into the other coil terminal of the first relay.

When the first relay is actuated by whatever means, its contacts switch positive 12 volts into the positive coil terminal of the second relay. When the second relay actuates upon receiving a positive 12-volt signal from the first relay, the positive 12 volt signal already fed to its common terminal is switched back to its own coil, and to the positive lead for the piezo alarm. The feedback of +12 volts back into the second relay after its initial actuation "locks" the relay on, and causes the piezo alarm to sound; and it may not be released, and the alarm muted, until the extensible structure is retracted, the gearshift returned to "park," and the ignition turned off.

Summary of operation is as follows:

MODE 1 CONDITIONS: Mast is extended, ignition is on, operator shifts out of "park:"

(a) gearshift position sensor passes a voltage from the flashing red lights, or from the vehicle's ground, into the coil of the first relay.

(b) the first relay actuates and passes positive 12 volts to the coil of the second relay and to the piezo alarm.

(c) the second relay actuates and feeds voltage back into its own positive coil terminal, thus latching the relay on.

(d) The piezo alarm continues to sound until the operator turns the ignition switch off and returns the gearshift lever to "park."

MODE 2 CONDITIONS: Mast is retracted; ignition is on, operator shifts out of park.

(a) Because the mast is retracted, no voltage flows to the flashing red light(s), or the alternate signal point and vehicle ground, and no voltage flows into the coil of the first relay.

(b) Because the first relay does not actuate, no voltage flows into the second relay and into the piezo alarm.

(c) the second relay can not be actuated under this scenario and thus can not lock itself on.

(d) Thus, the system is effectively muted because no hazardous condition exists.

In addition to the sensors 5, 12, and 42, 46 and the control module 16, the system can include a harness and a fuse tap for ease of installation. The harness interconnects the voltage sources in the van or vehicle to the control module 16. The harness includes a mini DB-9 female connector and cabled with preferably 8-wire #22 AWG, although other connectors and sizes of AWG can be used without departing from the present invention. The connector permits easy end-user replacement of the control module 16 in the unlikely event of a failure and allows quick and easy connection of test equipment by the installer to verify or check correct connections to the vehicle's systems.

The fuse tap provides easy access to the vehicle's electrical system with complicated and time-consuming soldering and splicing. After a fused circuit, which is controlled by the ignition switch, has been located, the fuse for the circuit is removed from the vehicle's fuse block. The fuse is inserted into the lower socket on the fuse tap and the fuse is replaced in the van's fuse block. This restores the selected circuit to its original condition and provides a fused power tap for the system.

Installation of the System:

The system as described herein can be installed in a van or vehicle in any manner known to one skilled in the art. For example, the magnetic sensing system 40 can be installed as follows:

(1) Do not connect the harness connector to the CONTROL MODULE connector yet.

(2) Locate the RED and ORANGE wires in the harness. Fish these wires up behind the dash and bring them out within the mounting chassis of either of the two red flashing warning lights. Solder either of the two wires to one of the lamp terminals and the other wire to the remaining lamp terminal.

(3) Locate the MAGNETIC SENDING ELEMENT (or fixture). Place it on the gearshift lever as close to the steering column as possible (peel back the rubber shield on the gearshift lever if necessary). Do not epoxy the fixture holding the magnet to the gearshift lever yet. Orient the fixture so the ½ inch round magnet is aiming toward the vehicle's dashboard. The magnetic field from the fixture should hold it onto the shift lever. If not, use gaffer's or masking tape to hold it in place.

(4) Locate the MAGNETIC SENSING DEVICE. Connect the sensor wires to any device you have that will check continuity. When you first connect your checker it should show a closed circuit. When you move the sensor near the gearshift fixture the circuit should open.

(5) Move the sensor around on the dash until you find a place beneath the shift lever where your continuity checker shows an open circuit. Now, move the gearshift out of PARK and see if the checker shows a closed circuit. Continue making trial and error positioning of both components until the checker shows OPEN in PARK and CLOSED in any other position. Trace around the outline of the proximity sensor. Use an epoxy on the back of the shim and firmly press the shim/sensor unit onto the dash.

(6) Secure the sensor wires by routing them behind the dashboard. Preferred: drill a hole 3/16" hole in the dash ¼" from wire end of the sensor. Fish the BROWN and BLUE wires from the harness up through the hole and connect to the two sensor wires (polarity is not important). Retract the wires through the hole. If you prefer not to drill, rout the wires behind the dash in any convenient way.

(7) Take a piece of fine sandpaper and sand the shift lever surface where the shift fixture will be located. Using an epoxy, secure the shift fixture onto the shift lever. Before the epoxy sets up, re-check continuity to be sure you have the fixture and sensor in the right place relative to each other. Hold the fixture in place with gaffer's or masking tape if necessary. Continue to re-check until the epoxy sets up.

(8) Connect the harness to the CONTROL MODULE and be sure to tighten the connector screws. Locate a position under the dash for mounting the control box. Remove the protective backing from the Velcro (TM) on the back of the box and firmly press it into place. Orient the box so that the cable is at the bottom of the installation.

(9) Locate a convenient place under the dash for the PIEZO SIREN. Before installing, connect the YELLOW wire from the harness to the RED wire on the alarm; and the GREEN harness wire to the BLACK wire from the alarm. Remove the Velcro (TM) protective backing from the alarm and press the alarm unit into place.

(10) Connect the BLACK harness wire to any metal ground point on the vehicle. Use a terminal lug if possible.

(11) Using a voltmeter, determine which fuse in your vehicle's fuse block is controlled by the ignition switch. The fuse you select should have no voltage across it when the ignition is OFF, and should show 12 volts DC when the ignition is ON. Remove that fuse from the fuse block, plug it into the fuse tap in the socket beneath the 2-amp fuse on the tap, and replace the fuse tap into the fuse block. Using a crimp tool, connect the fuse tap to the WHITE wire.

(12) The installation is almost complete. Test the system. Raise the van's mast. Start the engine. Shift out of PARK. The alarm should sound. It should continue to sound until you return the shift to PARK and turn the engine off. Now lower the mast. Re-start the engine and shift out of PARK. The alarm should be silent.

(13) Using cable ties, secure excess wires beneath the dash. Secure to solid underdash structures.

While the invention has been described in detail with reference to the preferred embodiment thereof, it will be apparent to one skilled in the art that various changes and modifications can be made and equivalents employed, without departing from the present invention.

What is claimed is:

1. An audible alarm system for vehicles having an extensible structure, the system comprising:
a sensor for sensing a first position and a second position of a vehicle's gearshift lever, wherein the sensor is affixed to an exterior of the vehicle's dashboard; and
a control module, the control module receiving an electrical signal from said extensible structure when the extensible structure is fully or partially deployed and, wherein the control module communicates the electrical signal to an audible alarm if the sensor senses that the vehicle's gearshift lever has been moved from the first position to the second position, and wherein the system does not inhibit the vehicle from being driven.

2. The system of claim 1, wherein at least a portion of the sensor is affixed to the vehicle's gearshift lever.

3. The system of claim 1, wherein the sensor is a microswitch.

4. The system of claim 3, wherein the microswitch is a normally closed single pole single throw microswitch.

5. The system of claim 1, wherein the sensor is an infrared LED and an infrared receptor affixed to an exterior of the vehicle's dashboard.

6. The system of claim 1, wherein the sensor is a magnetic device.

7. The system of claim 6, wherein the magnetic device comprises a magnetic sensing switch and a magnet.

8. The system of claim 1, wherein the control module comprises an enclosure, a circuit board, and a plurality of electrical connections.

9. The system of claim 1, further comprising a remotely controlled switching device.

10. The system of claim 9, wherein the switching device is an electromechanical device.

11. The system of claim 9, wherein the switching device is a semi-conductor circuit which uses the existence of a control voltage to enable a passage of electricity from the device's input terminal through it to its output terminal.

12. The system of claim 9, wherein the switching device is an optical switch device.

13. The system of claim 9, wherein the switching device is a magnetic circuit.

14. The system of claim 1, wherein the alarm is a piezo alarm siren.

15. The system of claim 1, further comprising a flashing light.

16. The system of claim 1, wherein the first position is park and the second position is any other drive position.

17. An audible alarm system for vehicles having an extensible structure, the system comprising:
a sensor for sensing a first position and a second position of a vehicle's gearshift lever, wherein the sensor comprises a magnetic sensing switch affixed to a vehicle's dashboard and a magnet affixed to the vehicle's gearshift lever; and
a control module, the control module receiving an electrical signal from said extensible structure when the extensible structure is fully or partially deployed and, wherein the control module communicates the electrical signal to an audible alarm if the sensor senses that the vehicle's gearshift lever has been moved from the first position to the second position and wherein the system does not inhibit the vehicle from being driven.

18. The system of claim 17, wherein the first position is park and the second position is any other drive position.

19. A method of warning an operator of a vehicle having an extensible structure when the vehicle is about to be driven with the extensible structure deployed, the method comprising the step of:
sensing a first position and a second position of a vehicle's gearshift lever;
receiving an electrical signal from said extensible structure when the structure is fully or partially deployed; and
communicating the electrical signal to an audible alarm if the vehicle's gearshift lever has been moved from the first position to the second position and wherein moving the gearshift lever does not inhibit the vehicle from being driven.

20. The method of claim 17, wherein the first position is park and the second position is any other drive position.

21. An audible alarm system for a television microwave truck having an extensible pneumatic mast, the system comprising:
a sensor for sensing a first position and a second position of the truck's gearshift lever, wherein the sensor is affixed to an exterior of the truck's dashboard; and
a control module, the control module receiving an electrical signal from the extensible pneumatic mast when the extensible pneumatic mast is fully or partially deployed and, wherein the control module communicates the electrical signal to an audible alarm if the sensor senses that the truck's gearshift lever has been moved from the first position to the second position.

22. The system of claim 21, further comprising a microwave transmitter attached to the extensible pneumatic mast.

23. The system of claim 22, wherein the truck is an ENG van.

* * * * *